July 24, 1928.
E. L. WESTMORELAND
EXTENSIBLE CHASSIS FOR AUTOMOBILES
Filed Dec. 31, 1926
1,678,411
2 Sheets-Sheet 1
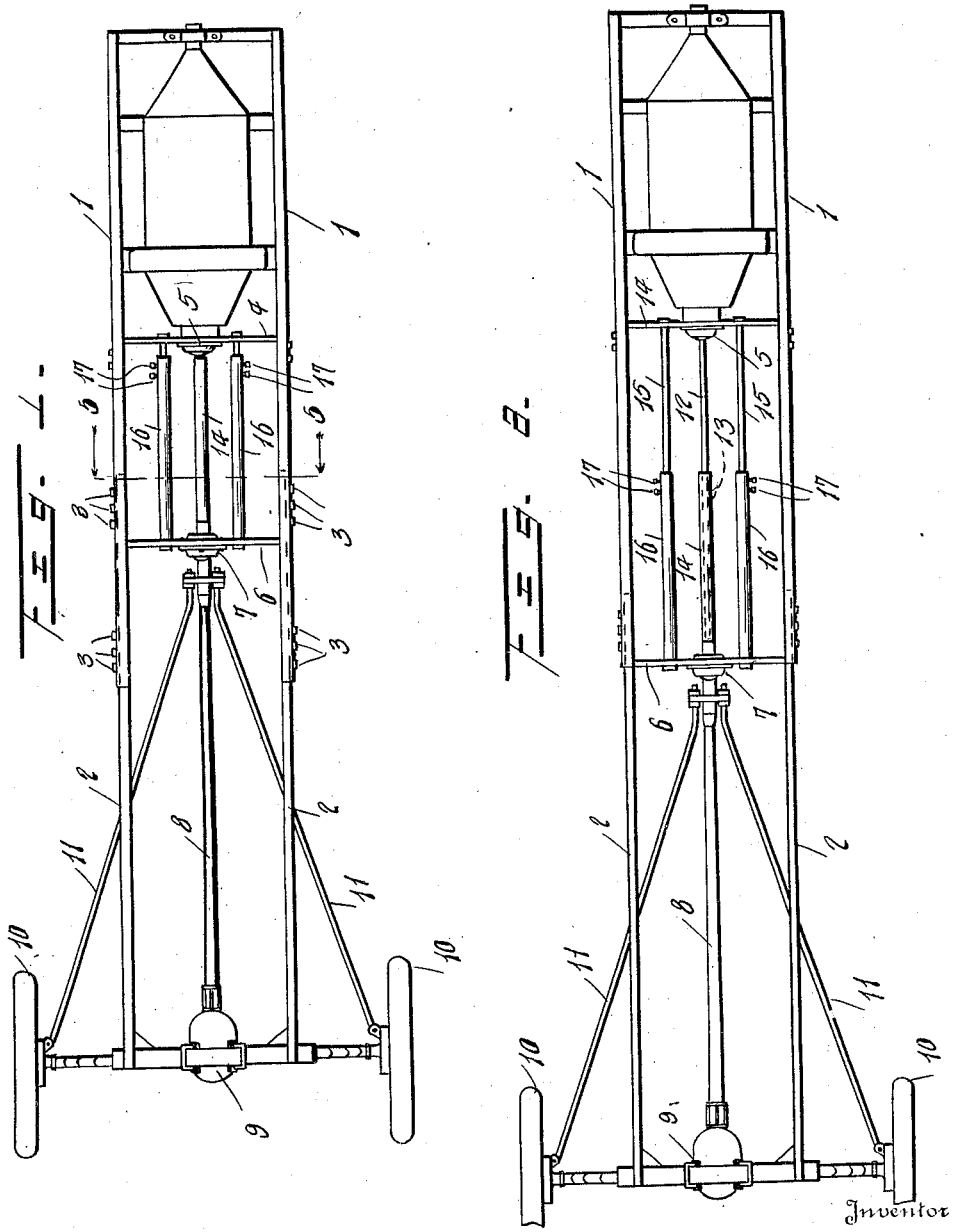

July 24, 1928.
E. L. WESTMORELAND
1,678,411
EXTENSIBLE CHASSIS FOR AUTOMOBILES
Filed Dec. 31, 1926   2 Sheets-Sheet 2
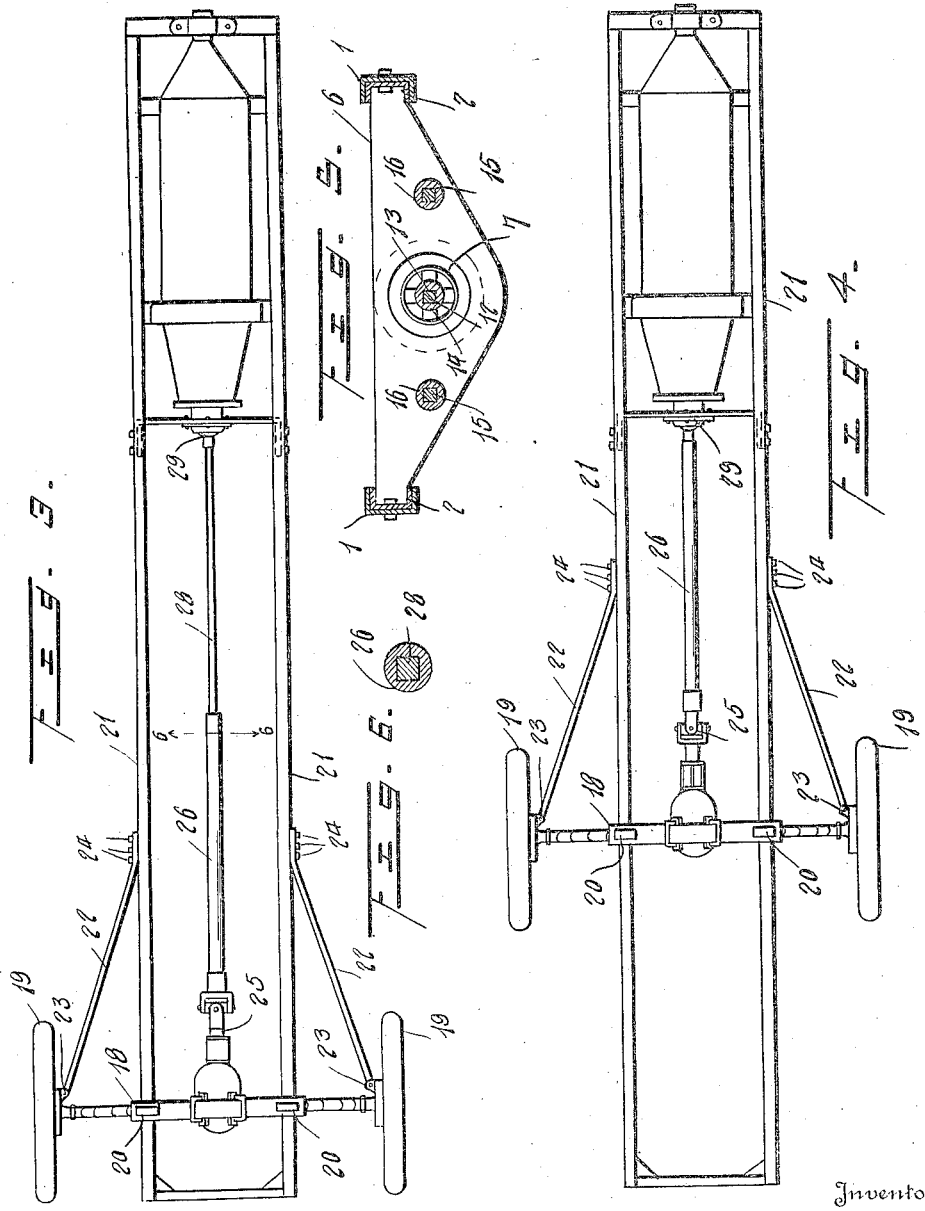
Inventor
E. L. Westmoreland,
Attorney Patented July 24, 1928.

1,678,411

UNITED STATES PATENT OFFICE.

ENNES L. WESTMORELAND, OF OGDEN, UTAH.

EXTENSIBLE CHASSIS FOR AUTOMOBILES.

Application filed December 31, 1926. Serial No. 158,238.

The invention relates to means for adjusting the length of the chassis of automobiles, and also for regulating the wheel base of automobiles, and has for its object the provision of means including a telescoping shaft interposed in the drive shaft of the automobile by which the automobile frame may be adjusted in length, and also by which the wheel base of the vehicle may be regulated irrespective of the adjustment of the frame.

The invention will be described in detail hereinafter and will be found illustrated in the accompanying drawings in which Figure 1 is a fragmentary view of an automobile frame including means for adjusting the length of the frame, showing the device in its contracted position, Figure 2 a similar view showing the frame in its greatest extended position, Figure 3 a view of a modified form by which the rear axle assembly may be adjusted on the frame, showing the rear axle in its extended position, Figure 4 a similar view showing the rear axle assembly in an adjusted position restricting the wheel base, Figure 5 is a transverse sectional view on a plane indicated by the line 5—5 of Figure 1, and Figure 6 is a transverse sectional view on a plane indicated by the line 6—6 of Figure 3.

In the drawings similar reference characters will be used to designate corresponding parts throughout the several views.

Referring to Figures 1 and 2, the side beams of the frame are in two sections, the front sections, designated 1, and the rear sections designated 2, being longitudinally adjustable on one another, and adapted to be held in adjusted position by means of transverse bolts 3 secured through the overlapping ends of the sections 1 and 2. A cross beam 4 connects the two front side beams 1, and carries a universal joint 5 to which is connected the rear end of the engine shaft (not shown). A cross beam 6 is secured to and connects the rear side beams 2, and carries a universal joint 7 connected with the drive shaft 8 leading to the rear axle contained in the housing 9, 10 indicating the drive wheels of the vehicle. 11 indicates the usual brace rod connecting the ends of the axle housing 9 with the drive shaft 8 in the usual manner.

12 indicates a drive shaft section that is as shown in Figure 5 polygonal in cross section and engaging for slidable movement in the bore 13 of a tubular shaft section 14, the bore 13 being of the same shape in cross section as the shaft section 12, and thus provide for rotation of the two shaft sections simultaneously. Arranged on each side of the telescoping shaft sections 12, 14, are telescoping brace members comprising bars 15 that slidably engage in the bores of tubular members 16, 17 indicating one or more set screws or other fastening means to secure the members 15 and 16 in adjusted positions.

In Figures 3 and 4 the principle of the telescoping shaft is shown applied to an automobile wherein the frame is not adjustable but the rear axle assembly designated 18 and carrying the drive wheels 19 is provided with arched members 20 slidably engaging the side beams 21 of the vehicle frame, and brace members 22 connect the ends of the rear axle assembly as shown at 23 with the side beams 21 and adapted to be secured thereto by means of one or more bolts 24 at different positions along said side beams 21, the rear axle assembly 18 being shown in its rearwardmost position in Figure 3 and in its forwardmost position in Figure 4. 25 indicates a universal joint adjacent to the rear axle housing and having a tubular shaft 26 connected therewith and having its bore 27 polygonal in cross section to receive the shaft section 28 that is polygonal in cross section of similar contour to the bore 27 of the tubular shaft 26, this structure permitting sliding adjustment of the two sections 26 and 28 and insuring rotation of the two sections simultaneously. 29 indicates a universal joint to which the section 28 is connected and said universal joint is also connected to the engine shaft in the usual manner.

In the drawings the extensible feature has been shown applied to motor vehicles in which the drive is exerted by the rear wheels and means for extending the drive shaft has as a consequence been necessary. The invention, however, may be adapted to use with motor vehicles on which the drive is exerted by the front wheels only and in that event it will be apparent that the extensible axle would be omitted, as not required.

What is claimed is:—

1. An extensible frame for automobiles, comprising front and rear frame sections, side members of said frame sections formed of channel beams, the channel beams of one section slidable within the channel beams of the other section, a cross beam engaging each section, sections of a telescoping shaft engaging the cross beams, and telescoping bracing members engaging said cross beams.

2. An extensible frame for automobiles, comprising front and rear frame sections side members of said frame sections formed of channel beams, the channel beams of one section slidable within the channel beams of the other section, a cross beam engaging each section, a universal joint carried by each cross beam, a tubular shaft extending from one of said joints and having its bore non-circular in cross section, a shaft non-circular in cross sectional outline extending from the other universal joint and engaging the bore of the tubular shaft, and telescoping braces connecting said cross beams, one member of each of said braces being tubular and the other member engaging in the bore of said tubular member.

3. An extensible frame for automobiles, comprising sectional front and rear side beams formed of interengaging members, a cross beam connecting the front side beams, another cross beam connecting the rear side beams, a tubular drive shaft carried by one of the cross beams and having a bore non-circular in cross section, a drive shaft carried by the other cross beam non-circular in cross section and engaging in the bore of the tubular shaft, and telescoping bracing members carried by said cross beams on opposite sides of the drive shaft.

In testimony whereof I affix my signature.

E. L. WESTMORELAND.